(12) United States Patent
Lau

(10) Patent No.: US 6,582,253 B1
(45) Date of Patent: Jun. 24, 2003

(54) LOCK-IN COMPACT FLUORESCENT LAMP (CFL) ADAPTOR

(76) Inventor: Kenneth Lau, 4327 Point Reyes Ct., Carlsbad, CA (US) 92008

( * ) Notice: Subject to any disclaimer, the term of this patent is extended or adjusted under 35 U.S.C. 154(b) by 0 days.

(21) Appl. No.: 09/587,547

(22) Filed: Jun. 1, 2000

(51) Int. Cl.⁷ .............................................. H01R 25/00
(52) U.S. Cl. ...................... 439/646; 439/232; 439/352
(58) Field of Search ..................... 439/646, 232, 439/236, 226, 350, 352, 354, 356, 357

(56) References Cited

U.S. PATENT DOCUMENTS

| | | | | |
|---|---|---|---|---|
| 4,596,433 A | * | 6/1986 | Oesterheld et al. | 339/112 |
| 5,065,292 A | * | 11/1991 | Aubrey | 362/260 |
| 5,864,461 A | * | 1/1999 | Cho | 361/674 |
| 6,059,593 A | * | 5/2000 | Pasternak | 439/236 |

* cited by examiner

*Primary Examiner*—P. Austin Bradley
*Assistant Examiner*—Truc Nguyen
(74) *Attorney, Agent, or Firm*—Charles C. Logan, II

(57) ABSTRACT

A lock-in compact fluorescent lamp (CFL) adaptor that would be screwed into the socket of a conventional incandescent lamp assembly. It has an adaptor casing whose respective top wall, bottom wall and outer side walls form an electrical components chamber for a ballast, a printed circuit board, and electrical wiring. A CFL post member socket is formed in the top wall of the adaptor casing. An electrical contact base is connected to the bottom wall of the adaptor casing and it has a conventional externally threaded outer electrical contact surface that would be received into a conventional incandescent lamp socket. The adaptor has structure to prevent unauthorized removal of the compact fluorescent lamp from the adaptor. The adaptor casing also has a pair of vertically oriented slots for receiving and capturing the bottom legs of a harp used with a lamp assembly. One alternative embodiment of the adaptor has a removable electrical contact base. Another alternative embodiment has an adaptor designed to function with a compact fluorescent lamp having an inverted base structure.

9 Claims, 5 Drawing Sheets

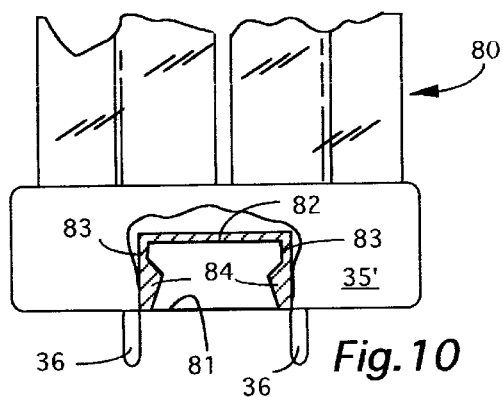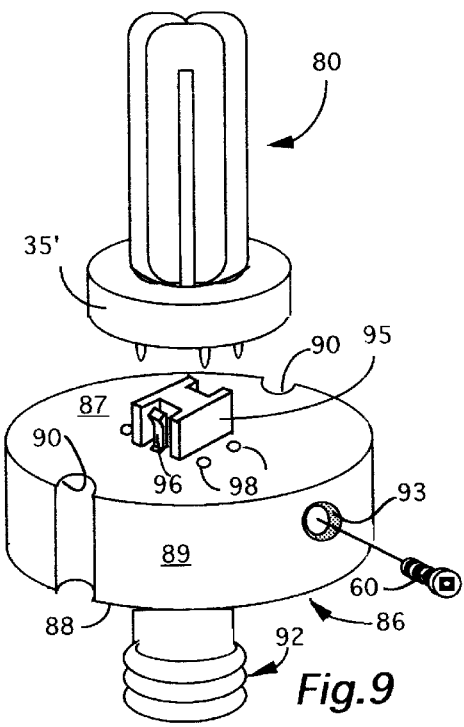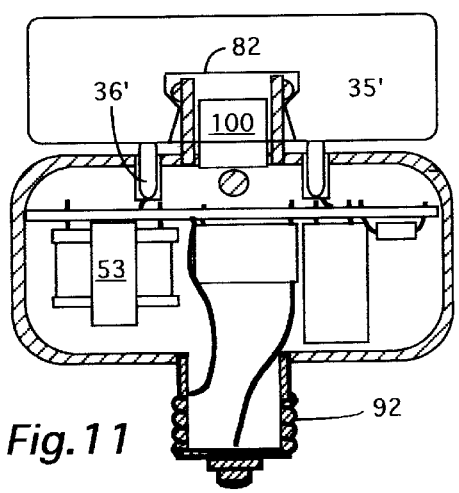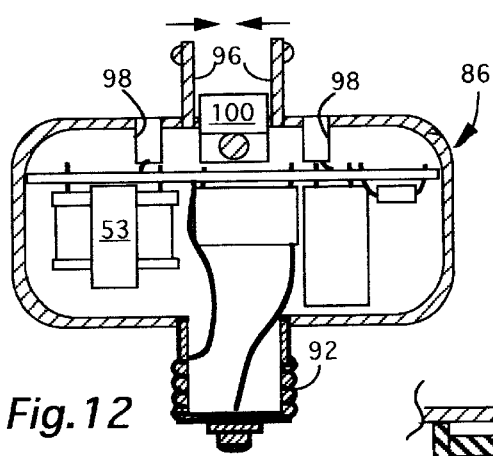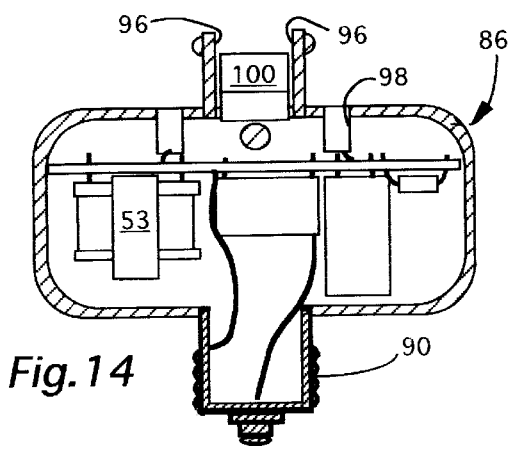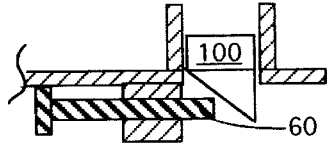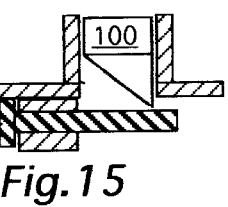

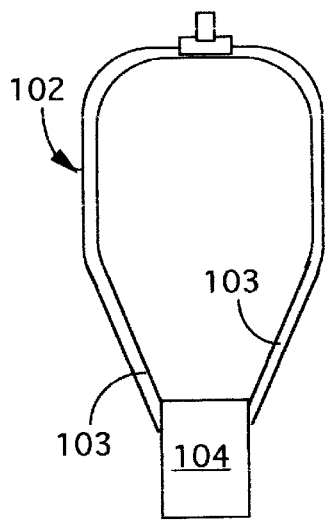
Fig. 16
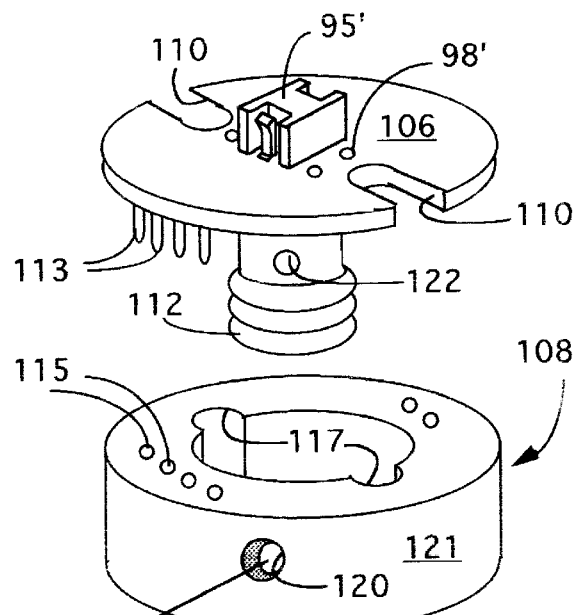
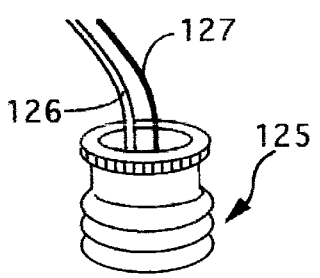
Fig. 18
Fig. 17
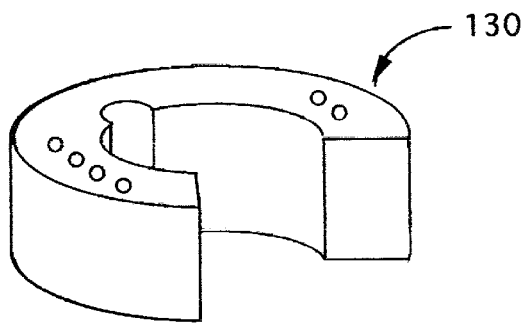
Fig. 19
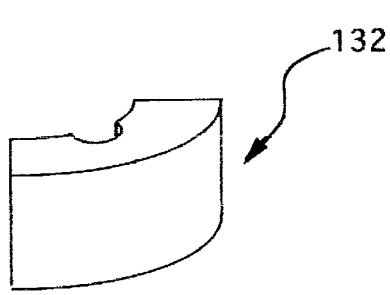
Fig. 20

LOCK-IN COMPACT FLUORESCENT LAMP (CFL) ADAPTOR

BACKGROUND OF THE INVENTION

The invention relates to compact fluorescent lamps (CFL) and more specifically to an adaptor that allows the CFL to be electrically connected in the socket of a conventional incandescent lamp.

It has been widely known for quite some time that fluorescent lamps use far less electricity than incandescent lamps. Major efforts have been made to convince consumers to convert their incandescent lamps to fluorescent lamps. In the early models, fluorescent lamps that could be screwed into a socket of an incandescent lamp fixture were quite large and cumbersome. The early florescent lamp was a tubular bulb formed in the shaped of a ring and the bulb was located outside the structure of the harp member that supports the lamp shade.

In recent years lamp manufacturers have developed a compact fluorescent lamp that is releasably plugged into an adaptor having an electrical contact base similar to that of an incandescent light bulb. The adaptor contains a ballast, a printed circuit board and the necessary electrical wiring.

The compact fluorescent lamps are smaller than the original fluorescent lamp models and also more efficient. A problem of the present day compact fluorescent lamp models is the fact that they can be removed from the incandescent lamp socket very easily and the CFL are very expensive. Normally an incandescent light bulb is approximately 25 cents and the CFL is priced in the range of $10.00 to $20.00 each.

An ideal application for the CFL's are professional users such as hotels. However, since they are easily removed and replacement is very expensive, the hotels are reluctant to use them due to pilferage. Another problem is that normally 100 watt lamps or 75–150 watt lamps have been used in hotel rooms. This poses a problem for the hotels since the CFL's price increases drastically in accordance to the wattage of the lamp. Also the higher the wattage of the CFL's, the taller the overall height is. Several lamp assemblies have smaller harps that cannot physically accept the higher wattage CFL's due to their increased height. As a result, the hotels have downgraded the wattage of the CFL's they use and the guests have complained that the light is not bright enough.

It is an object of the invention to provide a novel lock-in compact fluorescent lamp adaptor that will prevent hotel guests from stealing the CFL from a lamp assembly.

It is also an object of the invention to provide a novel lock-in compact fluorescent lamp adaptor that prevents removal of the harp thereby preventing removal of the CFL.

It is another object of the invention to provide a novel lock-in compact fluorescent lamp adaptor that has a pleasing cosmetic appearance and whose locking features are not externally visible.

It is an additional object of the invention to provide a novel lock-in compact fluorescent lamp adaptor that is economical to manufacture and market.

It is a further object of the invention to provide a novel lock-in compact fluorescent lamp adaptor that interacts with the legs of the harp of the lamp assembly to prevent unauthorized removal of the CFL.

SUMMARY OF THE INVENTION

The novel lock-in compact fluorescent lamp adaptor has been designed to be used with lamp assemblies that have an existing light socket for receiving an incandescent light bulb.

The present compact fluorescent lamps available in the market place have a post member that extends downwardly from their bottom end. This post member is received in a plug-in socket in the top of an adaptor having an electrical contact base that is screwed into a conventional incandescent light socket. The novel lock-in compact fluorescent lamp adaptor has been made shorter than previous adaptors by designing the adaptor casing in the shape of a toroid and placing the ballast and other electrical components in its radially spaced electrical components chamber. The top of the adaptor is designed to removably receive the post member of the CFL and removably hold it in place with a pair of laterally spaced retaining clips. An electrical contact base is connected to the bottom wall of the adaptor casing and it has a conventional externally threaded outer electrical contact surface that would be received into a conventional incandescent lamp socket.

A horizontal aperture in the outer wall surface of the adaptor casing communicates with an interior wall of the adaptor casing at a position spaced from but parallel to one of the retaining clips. The inner wall of the adaptor casing has a threaded aperture that receives a locking screw which when advanced to its innermost position squeezes the retaining clip against the post member of the compact fluorescent lamp thereby preventing its removal from the adaptor casing. The screw is of a vandal resistant type Saving a special tool receiving recess in its head that can only be tightened or loosened by a person having the proper tool. The previously described structure prevents removal of the CFL from the adaptor but does not prevent the entire unit from being unscrewed from the incandescent lamp socket. In order to overcome this problem, the outer periphery of the adaptor casing has been designed with a pair of vertically oriented slots that receive and capture the bottom legs of the harp of the lamp fixture assembly. When the bottom legs of the harp are captured in the vertical slots of the adaptor casing, the adaptor casing cannot be unscrewed from the incandescent lamp socket.

With the reduced height of the adaptor casing, compact fluorescent lamps rated up to 42 watts can be utilized with a harp having a relatively short height. The 42 watt CFL is approximately equivalent to a 200 watt incandescent lamp.

An alternative embodiment of the novel adaptor discloses an adaptor casing having a telescopically removable electrical contact base. Two other alternative embodiments are illustrated and described for an adaptor that can be utilized with a CFL having an inverted base structure.

DESCRIPTION OF THE DRAWINGS

FIG. 3 is an exploded front perspective view of the CFL and the adaptor;

FIGS. 7A and 7B are schematic vertical cross sectional views of a first alternative embodiment of the adaptor casing;

FIGS. 8A and 8B are schematic vertical cross sectional views of a second alternative embodiment of the adaptor casing;

FIG. 9 is an exploded front perspective view of a third alternative embodiment of the adaptor casing that is used with a CFL having an inverted base;

FIG. 10 is a partial side elevation with portions broken away showing the bottom end of a CFL with an inverted base;

FIG. 11 is a schematic vertical cross sectional view showing the bottom end of the CFL engaging the top end of the CFL adaptor;

FIG. 12 is a schematic vertical cross sectional view of the third alternative embodiment of the CFL adaptor casing showing the locking wedge in an unlocked position;

FIG. 13 is a schematic vertical cross sectional view illustrating how the wedge would look in the unlocked position at 90 degree view;

FIG. 14 is a schematic vertical cross sectional view of the third alternative embodiment of the adaptor casing showing the locking wedge screwed into a locked position;

FIG. 15 is a partial schematic view of the locking wedge in its upper most locked position;

FIG. 16 is a front elevation view of a lamp harp whose bottom legs are permanently secured to the incandescent lamp socket;

FIG. 17 is an exploded front perspective view of a fourth alternative embodiment of the novel CFL adaptor that would be used with the CFL having an inverted base;

FIG. 18 is a front perspective view of an alternative electrical contact base;

FIG. 19 is a front perspective view of a fifth alternative embodiment of the CFL adaptor casing;

FIG. 20 is a front perspective view showing an adaptor casing component that can be used with the embodiment illustrated in FIG. 19.

DESCRIPTION OF THE PREFERRED EMBODIMENT

Figure 1:
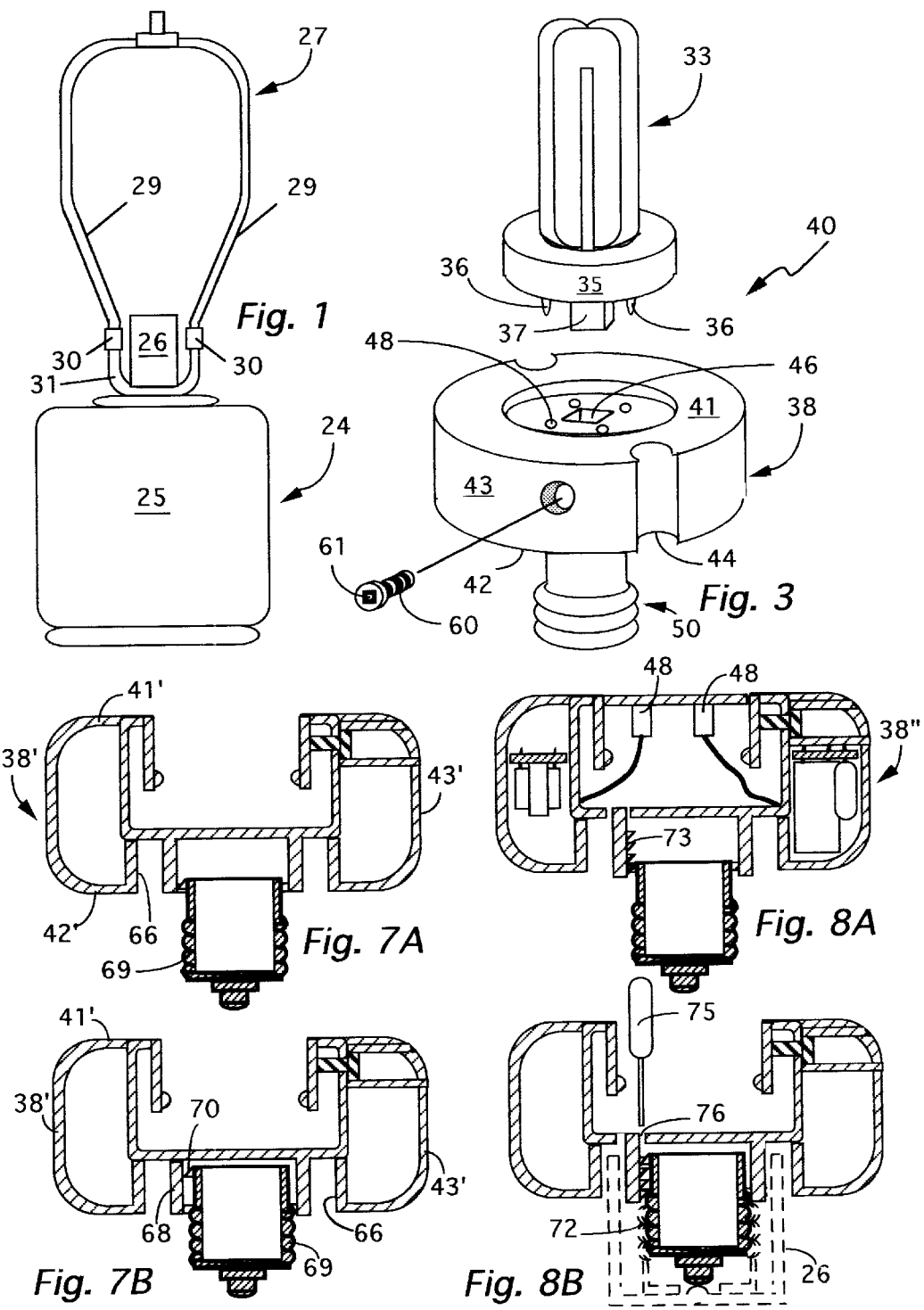
FIG. 1 is a side elevation view of a lamp assembly having an incandescent lightbulb socket.

The novel lock-in compact fluorescent lamp adaptor will now be described by referring to FIGS. 1–24 of the drawings. In FIG. 1, the lamp assembly 24 is illustrated having a base 25, an incandescent lightbulb socket 26 and a removable harp 27. Harp 27 has a pair of laterally spaced bottom legs 29 that are captured by tubular caps 30 and secured to the upstanding arms of the U-shaped base portion 31.

Figure 2:
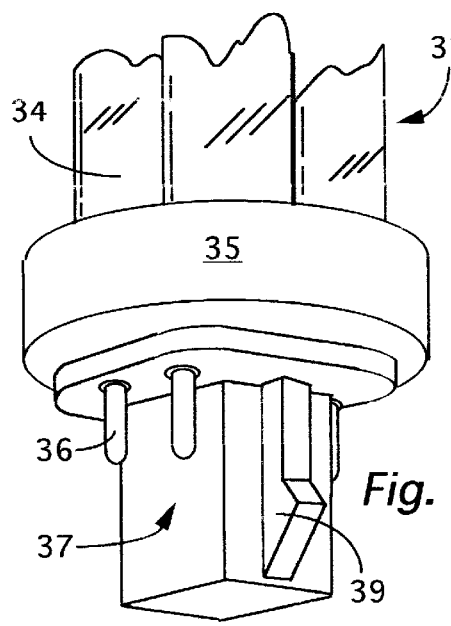
FIG. 2 is a partial front perspective view of the bottom end of a compact fluorescent lamp.

Compact fluorescent lamp 33 is illustrated in FIG. 2. It has fluorescent lamp tubes 34, a lamp base portion 35, a plurality of electrical contact pins 36 and a post member 37. A wedge-shaped cam surface 39 extends from opposite lateral side walls of post member 37 and their function will be discussed later.

FIG. 3 is an exploded perspective view illustrating how the bottom end of CFL 33 attaches to the top end of adaptor 40. Adaptor 40 has a casing 38 having a top wall 41, a bottom wall 42 and outer side walls 43. A pair of vertical slots 44 are formed 14 in outer side walls 43 for receiving and capturing the legs 29 of harp 27. A CFL post member socket 46 is formed in top wall 41 for receiving post member 37. A plurality of electrical contact pin sockets 48 are also formed in top wall 41 for removably receiving the electrical contact pins 36. An electrical contact base 50 is connected to bottom wall 42. Electrical contact base 50 has a conventional externally threaded outer electrical contact surface that would be received into a conventional incandescent lamp socket.

Figure 4:
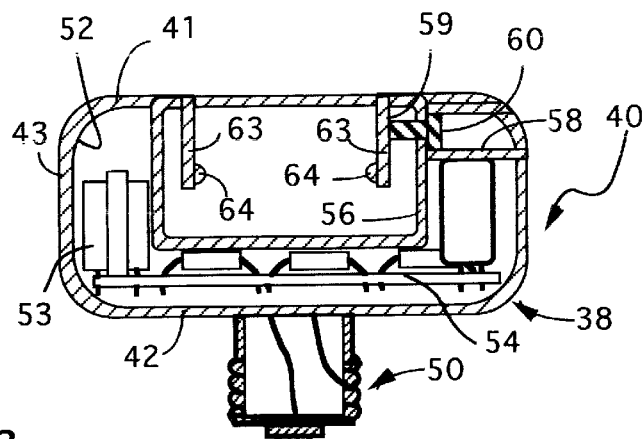
FIG. 4 is a schematic vertical cross sectional view of the novel CFL adaptor.
Figure 5:
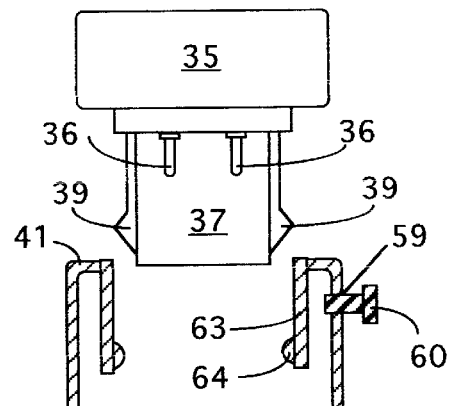
FIG. 5A is a schematic vertical cross sectional view illustrating the CFL prior to having its post member inserted into the adaptor casing.
FIG. 5B is a schematic vertical cross sectional view showing the bottom end of the CFL captured in the top end of the adaptor casing.
Figure 5A:
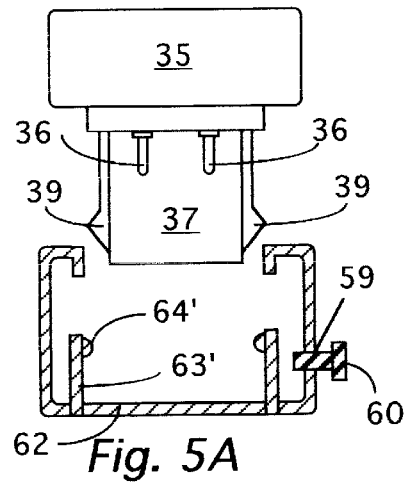
Figure 6:
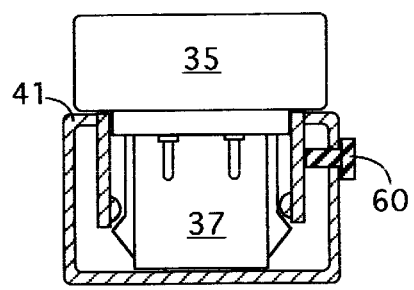
FIG. 6A is similar to FIG. 5A but has the retaining clips extending upwardly from a bottom wall.
FIG. 6B is similar to FIG. 5B but has the retaining clips extending upwardly from a bottom wall.
Figure 6A:
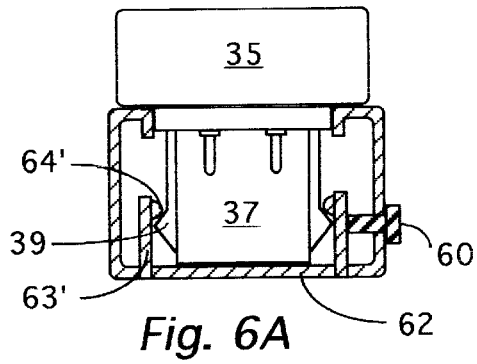

FIG. 4 is a schematic vertical cross sectional view of adaptor 40. It shows adaptor casing 38 having a top wall 41, a bottom wall 42, and side walls 43 that form an electrical components chamber 52. Ballast 53, a printed circuit board 54 and various electrical wires are contained within chamber 52 and connected to each other and the electrical contact base in a manner well known in the art. An annular internal wall 56 is formed inwardly from side wall 43. Aperture 58 is formed in outer wall 43 and it communicates with interior wall 56 that has a threaded aperture 59 therein. A vandal resistant screw 60 is threaded therein and it has a special tool receiving recess 61 (see FIG. 3) in its head. A pair of retaining clips 63 extend downwardly from top wall 41 and they each have an inwardly extending protrusion 64 adjacent their bottom ends. FIGS. 5A and 5B illustrate the manner in which the wedge-shaped cam surfaces 39 travel over protrusions 64 and then become locked in position. Then screw 60 is rotated inwardly against retaining clip 63, and post member 37 of compact fluorescent lamp 33 cannot be removed from adaptor 40. FIGS. 6A and 6B illustrate an alternative embodiment having retaining clips 63' extending upwardly from bottom wall 62. The wedge-shaped cam surfaces 39 travel over protrusions 64' and then become locked in position. Screw 60 is then rotated inwardly against retaining clip 63' and post member 37 of compact fluorescent lamp cannot be removed from adaptor 40.

FIGS. 7A and 7B are schematic vertical cross sectional views of a first alternative embodiment of the casing 38'. It has a top wall 41', side walls 43' and bottom wall 42'. An annular cavity 66 is formed in bottom wall 42' so that adaptor casing 38 can set down over the top end of the existing incandescent socket 26. A tubular neck 68 telescopically receives a retractable electrical contact base 69. Electrical contact base 69 has an annular rib or flange 70 that produces a friction contact that holds retractable base 69 in its upper position (FIG. 7B).

FIGS. 8A and 8B are schematic vertical cross sectional views of a second alternative embodiment having an adaptor casing 38". These figures also show the electrical components inside casing 38". Electrical contact base 72 has teeth extending from its outer surface that mate with one way locking teeth 73. In order to release electrical contact base 72, a pin 75 is inserted through an aperture 76 and pushed downwardly against the one way locking teeth 73 thereby disengaging the electrical contact base 72.

A compact fluorescent lamp 80 with an inverted base is illustrated in FIGS. 9 and 10. It has a post member recess 81 having a top wall 82 and a pair of laterally spaced side walls 83. A wedge-shaped cam surface 84 extends inwardly from the respective side walls 83. Electrical contact pins 36' surround post member recess 81 and extend downwardly from lamp base portion 35'. Adaptor casing 86 has a top wall 87, a bottom wall 88, and side walls 89. A pair of vertical slots 90 are formed in side walls 89 for receiving and capturing the bottom legs of a harp 27. An electrical contact base 92 extends downwardly from bottom wall 88. An aperture 93 is formed in side wall 89 to allow the vandal resistant screw 60 to be inserted therethrough. A post member 95 extends upwardly from top wall 87. A pair of retaining clips 96 also extend upwardly and the manner in which they function will be discussed later. A plurality of electrical contact pin sockets 98 are also formed in top wall 87. FIGS. 11–15 relate to the adaptor casing illustrated in FIG. 9. FIGS. 11, 12 and 14 are schematic vertical cross sectional views of adaptor casing 86. FIG. 11 shows the bottom end of CFL 80 captured in post member recess 81 by retaining clips 96. Locking wedge 100 is illustrated in FIGS. 13 and 15, first in the unlocked position and then in the locked position. FIGS. 11 and 14 show wedge 100 in the locked position and FIG. 12 shows it in its unlocked position. Locking wedge 100 is pushed upwardly by the vandal resistant screw 60 into the locked position. The retaining clips 96 are then prevented from flexing inward and lamp base 35' is locked in position.

FIG. 16 illustrates a harp 102 having its bottom legs 103 permanently secured to incandescent light bulb socket 104. The adaptor that would function with this structure is illustrated in FIGS. 17–20. The embodiment illustrated in FIG. 17 shows a two member structure having a disc member 106 and an adaptor casing 108. Disc member 106 has a post member 95' extending upwardly from its top surface. It also has a plurality of electrical contact pin sockets 98'. A pair of slots 110 are formed in the peripheral edge of disc member 106. An electrical contact base member 112 extends downwardly from the bottom of disc member 106. A plurality of electrical contact pins 113 also extend downwardly from the bottom of disc member 106. Adaptor casing 108 has a plurality of electrical contact sockets 115 that receive electrical contacts 113. A pair of vertical slots 117 align with slots 110 to receive the legs 103 of harp 102. The standard electrical components would be positioned inside adaptor casing 108. An aperture 120 is formed in side wall 121 to receive the optional vandal resistant screw 60 which would go into threaded bore 122. An alternative electrical contact base 125 is illustrated in FIG. 18. It shows that wire leads 126 and 127 could be used in a manner already known in the prior art. In FIG. 19, an adaptor casing 130 is shown having a C-shaped configuration for mounting with a nondetachable lamp harp 102. Adaptor casing 130 could be used by itself alone or a wedge portion 132 could be connected thereto after the adaptor casing is attached to the legs 103 of harp 102.

Figure 21:
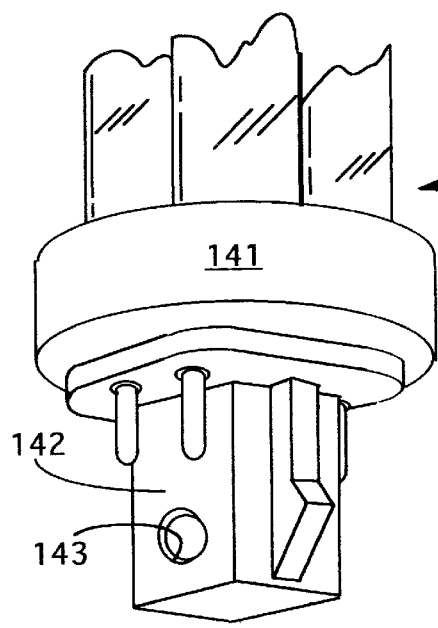
FIG. 21 is a partial front perspective view of the bottom end of a compact fluorescent lamp having a modified post member.
Figure 22:
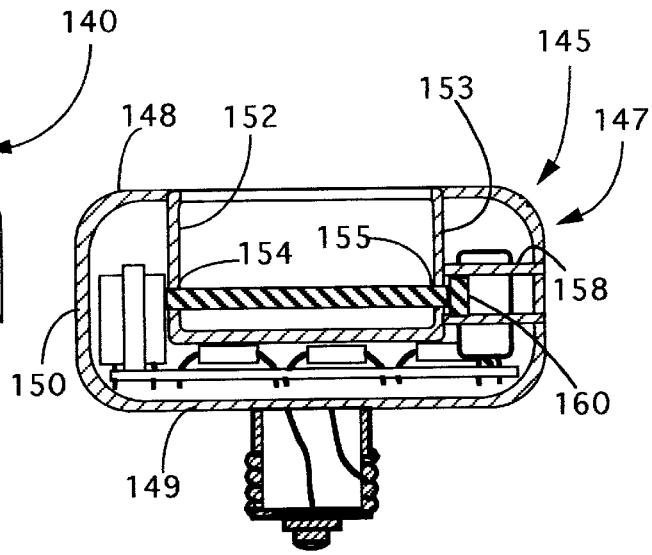
FIG. 22 is a schematic vertical cross sectional view of an alternative CFL adaptor that would be used with the CFL in FIG. 21.
Figure 23:
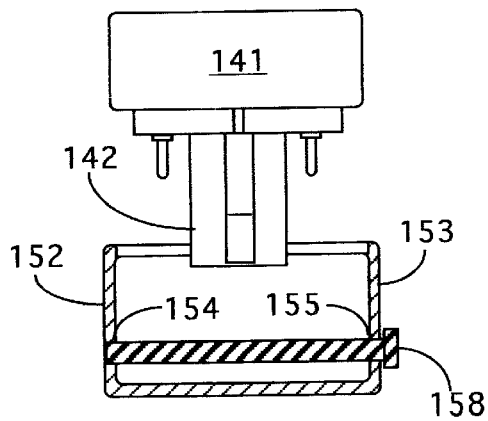
FIG. 23 is a schematic vertical cross sectional view illustrating the CFL of FIG. 21 prior to having its post member inserted into the alternative CFL adaptor illustrated in FIG. 22.
Figure 24:
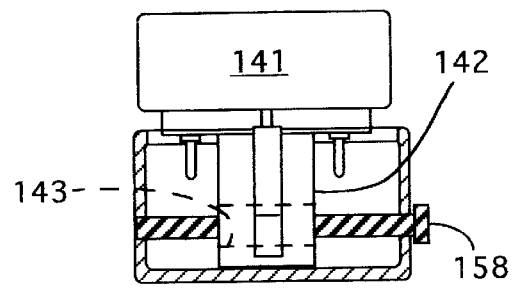
FIG. 24 is a schematic vertical cross sectional view illustrating the bottom end of the CFL of FIG. 21 captured in the top end of the adaptor casing illustrated in FIG. 22.

A CFL 140 having a base portion 141 and a modified post member 142 is illustrated in FIG. 21. It has a bore hole 143 passing entirely through its width. Adaptor 145 is used with CFL 140 and it has an adaptor casing 147. Adaptor casing 147 has a top wall 148, a bottom wall 149 and outer side walls 150. A pair of laterally spaced inner walls 152 and 153 have respectively threaded apertures 154 and 155. An aperture 158 is formed in side wall 150 and it communicates with aligned threaded bore hole 154 and 155. A vandal resistent screw 158 is threaded through bore holes 154 and 155 and through bore hole 143 in post member 142. Screw 158 has a special tool receiving recess in its head.

It is to be understood that any of the structure in any of the individual alternative embodiments of the adaptor may be used interchangeably if needed. Also it is to be understood that the electrical contact base of any of the embodiments may have a ratchet structure.

What is claimed is:

1. A lock-in compact fluorescent lamp (CFL) adaptor comprising:

an adaptor casing having a vertical Y-axis, a top wall, a bottom wall and outer side walls connected to said respective top and bottom walls to form an electrical components chamber therein;

a CFL post member socket is formed in said top wall of said adaptor casing for removably receiving a post member of a conventional compact fluorescent lamp (CFL); a plurality of electrical contact pin sockets are also formed in said top wall of said adaptor casing for removably receiving the electrical contact pins of a conventional CFL; said CFL post member socket has therein a pair of laterally spaced upright oriented retaining clips that would press inwardly against opposite lateral sides of a post member of a post member of a conventional CFL lamp when inserted into said CFL post member socket; said retaining clips being integrally formed with said top wall of said adaptor housing;

an electrical contact base is connected to said bottom wall of said adaptor casing and it has a conventional externally threaded outer electrical contact surface that would be received into a conventional incandescent lamp socket;

a ballast, a printed circuit board, and electrical wiring are located in said electrical components chamber; and means within said CFL post member socket for preventing removal of a post member of a conventional CFL from said CFL post member socket formed in said top wall of said adaptor casing; and wherein said CFL post member socket has a bottom wall having a top surface and said retaining clips each having a top end, a bottom end, an inner surface and an outer surface and each has a protrusion extending outwardly from said inner surface adjacent said top; said bottom end of said retaining clips being connected to said top surface of said bottom wall of said CFL post member socket; and wherein said means for preventing removal of a post member of a conventional CFL from said adaptor casing comprises a locking means for preventing at least one of said retaining clips from being moved outwardly which would allow the post member of a CFL to be removed from said CFL post member socket; and wherein said locking means further comprises:

a primary aperture in said side wall of said adaptor casing at a location perpendicularly aligned with said outer surface of one of said retaining clips;

an inner wall in said adaptor casing between said side wall and said retaining clips, said inner wall having a threaded secondary aperture aligned with said primary aperture; and a locking screw in said threaded secondary aperture which when screwed inwardly prevents outward movement of said retaining clip so that a CFL could not be removed from said adaptor.

2. A lock-in compact fluorescent lamp (CFL) adaptor as recited in claim 1 wherein said screw has a head having a special tool receiving recess.

3. A lock-in compact fluorescent lamp (CFL) adaptor comprising:
- an adaptor casing having a vertical Y-axis, a top wall, a bottom wall and outer side walls connected to said respective top and bottom walls to form an electrical components chamber therein;
- a CFL post member socket is formed in said top wall of said adaptor casing for removably receiving a post member of a conventional compact fluorescent lamp (CFL); a plurality of electrical contact pin sockets are also formed in said top wall of said adaptor casing for removably receiving the electrical contact pins of a conventional CFL;
- an electrical contact base is connected to said bottom wall of said adaptor casing and it has a conventional externally threaded outer electrical contact surface that would be received into a conventional incandescent lamp socket;
- a ballast, a printed circuit board, and electrical wiring are located in said electrical components chamber;
- means for preventing removal of a post member of a conventional CFL from said CFL post member socket formed in said top wall of said adaptor casing; and
- said adaptor casing having means for capturing bottom legs of a harp of a conventional incandescent light lamp assembly and thereby preventing said electrical contact base from being unscrewed from a conventional incandescent lamp socket.

4. A lock-in compact fluorescent lamp (CFL) adaptor as recited in claim 3 wherein said means for capturing the bottom legs of a conventional harp comprises a pair of vertically oriented slots in said outer side walls of said adaptor casing that can receive the bottom legs of a conventional harp.

5. A lock-in compact fluorescent lamp (CFL) adaptor as recited in claim 3 wherein said CFL post member socket has a pair of laterally spaced upright oriented retaining clips that would press inwardly against opposite lateral sides of a post member of a conventional CFL when inserted into said CFL post member socket.

6. A lock-in compact fluorescent lamp (CFL) adaptor as recited in claim 3 wherein said retaining clips each have a top end, a bottom end, an inner surface and an outer surface and each has a protrusion extending outwardly from said inner surface adjacent said bottom end.

7. A lock-in compact fluorescent lamp (CFL) adaptor as recited in claim 6 wherein said means for preventing removal of a post member of a conventional CFL from said adaptor casing comprises a locking means for preventing at least one of said retaining clips from being moved outwardly which would allow the post member of a CFL to be removed from said CFL post member socket.

8. A lock-in compact fluorescent lamp (CFL) adaptor as recited in claim 7 wherein said locking means comprises:
- a primary aperture in said side wall of said adaptor casing at a location perpendicularly aligned with said outer surface of one of said retaining clips;
- an inner wall in said adaptor casing between said side wall and said retaining clip; said inner wall having a threaded secondary aperture aligned with said primary aperture; and
- a locking screw in said threaded secondary aperture which when screwed inwardly prevents outward movement of said retaining clip so that a CFL could not be removed from said adaptor.

9. A lock-in compact fluorescent lamp (CFL) adaptor as recited in claim 8 wherein said screw has a head having a special tool receiving recess.

* * * * *